United States Patent
Rowe et al.

(10) Patent No.: US 9,873,513 B2
(45) Date of Patent: Jan. 23, 2018

(54) CABIN OUTFLOW VALVES HAVING LATERALLY-TAPERED SEALING SURFACES AND CABIN PRESSURE CONTROL SYSTEMS EMPLOYING THE SAME

(71) Applicant: HONEYWELL INTERNATIONAL INC., Morristown, NJ (US)

(72) Inventors: Steven Brian Rowe, Gilbert, AZ (US); William F. Ryan, Phoenix, AZ (US); Dan Birchak, Gilbert, AZ (US); Christopher Thomas, Tucson, AZ (US); Albert Kang, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 526 days.

(21) Appl. No.: 14/602,667

(22) Filed: Jan. 22, 2015

(65) Prior Publication Data

US 2016/0214721 A1  Jul. 28, 2016

(51) Int. Cl.
*B64D 13/02* (2006.01)
*B64D 13/04* (2006.01)
*F16K 1/22* (2006.01)
*F16K 1/226* (2006.01)

(52) U.S. Cl.
CPC .............. *B64D 13/04* (2013.01); *F16K 1/221* (2013.01); *F16K 1/2261* (2013.01)

(58) Field of Classification Search
CPC .......... B64D 13/04; B64D 13/02; F16K 1/221; F16K 1/2263; F16K 1/385; Y02T 50/56; G05D 13/02
USPC ....................................... 454/73–74
See application file for complete search history.

(56) References Cited

U.S. PATENT DOCUMENTS

| | | | |
|---|---|---|---|
| 7,185,853 B2 * | 3/2007 | Kelnhofer | B64D 13/02 244/129.5 |
| 7,198,062 B2 | 4/2007 | Hoffman et al. | |
| 8,342,920 B2 | 1/2013 | Tanner et al. | |
| 2011/0177770 A1 | 7/2011 | Tanner et al. | |
| 2013/0059517 A1 | 3/2013 | Horner et al. | |

* cited by examiner

*Primary Examiner* — Helena Kosanovic
(74) *Attorney, Agent, or Firm* — Lorenz & Kopf, LLP (57) ABSTRACT

Embodiments of a cabin outflow valve having one or more laterally-tapered sealing surfaces are provided, as are cabin pressure controls system including cabin outflow valves. In one embodiment, the cabin outflow valve includes a frame and a first door, which is pivotally coupled to the frame and which is rotated by an actuator between open and closed positions. The first door includes, in turn, a torque input point at which the actuator applies a closing force when rotating the first door into a closed position. A laterally-tapered sealing surface extends along a lateral axis of the cabin outflow valve and has a profile height decreasing with increasing proximity to the torque input point. The laterally-tapered sealing surface helps to ensure the formation of a complete lateral seal when in the first door is rotated into the closed position to significantly reduce or eliminate leakage through the cabin outflow valve.

20 Claims, 7 Drawing Sheets

CABIN OUTFLOW VALVES HAVING LATERALLY-TAPERED SEALING SURFACES AND CABIN PRESSURE CONTROL SYSTEMS EMPLOYING THE SAME

TECHNICAL FIELD

The present invention relates generally to laterally-sealing valves and, more particularly, to cabin outflow valves having laterally-tapered sealing surfaces, as well to cabin pressure control systems employing the same.

BACKGROUND

Aircraft are commonly equipped with cabin outflow valves, which are modulated during flight to maintain cabin air pressure within a desired range. The cabin outflow valve can include, for example, a frame, a first door (e.g., a first rectangular butterfly plate) pivotally mounted to a first portion of the frame, and a second door (e.g., a second rectangular butterfly plate) pivotally mounted to a second portion of the frame. The outflow valve may be mounted in the aircraft fuselage such that the first door is closer to the tail of the aircraft than is the second door; for this reason, the first door and the second door may be referred to as the "aft door" and the "forward door," respectively. The aft and forward doors may be mechanically linked by one or more linkages and move in unison between a closed position and a partially open or "cruise" position. In the cruise position, the partially opened doors permit pressurized air to flow from the aircraft fuselage to the ambient environment to reduce fuselage pressure and, perhaps, to provide additional thrust to the aircraft. In the closed position, the doors sealingly engage one another and the inner periphery of the frame to deter the outflow of pressurized air from the aircraft fuselage.

Modern cabin outflow valves can achieve relatively low leakage levels when in a closed position and subject to pressure loading during flight. Nonetheless, there exists a continued demand to provide cabin outflow valves having further reduced leakage levels. This presents a significant technical challenge as conventional approaches utilized to reduce outflow valve leakage are now largely exhausted or associated with certain undesirable tradeoffs. For example, previous approaches in reducing outflow valve leakage commonly focused on increasing conformity between the sealing surfaces of the outflow valve. However, manufacturing tolerances render further improvements in sealing surface conformity generally impractical without a substantial increase in manufacturing costs. Another manner in which outflow valve leakage can be reduced is through stiffening the outflow valve doors by adding material thereto. Stiffening the valve doors in this manner, however, increases manufacturing cost and adds undesired weight to the outflow valve. Finally, a cabin outflow valve can be produced to include various reinforcement structures, which serve to apply a more uniform closing force to the valve doors and thereby reduce leakage; however, this again adds undesired weight, bulk, and manufacturing cost to the outflow valve.

An ongoing need thus exists for a cabin outflow valve providing exceptionally low leakage levels when in a closed position and subject to pressure loading during flight. Ideally, embodiments of such a cabin outflow valve could be produced without adding weight, bulk, or significant manufacturing cost to the outflow valve. It is also desirable to provide embodiments of cabin pressure control system including such an ultralow leakage cabin outflow valve. Lastly, and more generally, it is desirable to provide embodiments of a laterally-sealing valve, which offers one or more of the foregoing benefits regardless of whether the valve is specifically implemented as a cabin outflow valve. Other desirable features and characteristics of the present invention will become apparent from the subsequent Detailed Description and the appended Claims, taken in conjunction with the accompanying Drawings and the foregoing Background.

BRIEF SUMMARY

Embodiments of a cabin outflow valve having one or more laterally-tapered sealing surfaces are provided. The cabin outflow valve is utilized in conjunction with an actuator, such as side-mounted drive motor having a rotary output. In one embodiment, the cabin outflow valve includes a frame and a first door, which is pivotally coupled to the frame and which can be rotated by the actuator between open and closed positions. The first door includes, in turn, a torque input point at which the actuator applies a closing force when rotating the first door into the closed position. A laterally-tapered sealing surface extends along a lateral axis of the cabin outflow valve and has a profile height that decreases with increasing proximity to the torque input point. The laterally-tapered sealing surface helps to ensure the formation of a complete lateral seal when the first door is rotated into the closed position to significantly reduce or eliminate leakage through the cabin outflow valve.

Embodiments of a cabin pressure control system are further provided. In one embodiment, the cabin pressure control system includes an actuator and a cabin outflow valve. The cabin outflow valve has a first door coupled to the actuator and configured to be rotated thereby between open and closed positions, a first sealing surface (e.g., on the first door), and a second sealing surface contacting the first sealing surface when the first door is rotated into the closed position. The first sealing surface has a near edge region and a far edge region spaced along a lateral axis of the outflow valve such that the near edge region is located closer to the actuator than is the far edge region. The first sealing surface is contoured such that the far edge region contacts the second sealing surface before the near edge region contacts the second sealing surface when the first door is rotated into the closed position.

Embodiments of a laterally-sealing valve utilized in conjunction with an actuator are further provided. In one embodiment, the laterally-sealing valve includes a frame, a first door pivotally coupled to the frame and configured to be rotated by the actuator between open and closed positions, a torque input point at which the actuator applies a closing force when rotating the first door into the closed position, a mating sealing surface, and a laterally-tapered sealing surface contacting the first sealing surface when the first door is rotated into the closed position. The laterally-tapered sealing surface has a profile height that decreases with increasing proximity to the torque input point, as taken along a lateral axis of the valve.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The following describes embodiments of a Cabin Pressure Control System (CPCS) including a cabin outflow valve having one or more laterally-tapered sealing surfaces, which enable the outflow valve to achieve exceptionally low leakage levels when closed and subject to pressure loading. Advantageously, the laterally-tapered sealing surface(s) can be produced without adding bulk, weight, or significant manufacturing cost to the cabin outflow valve. In an embodiment, the laterally-tapered sealing surfaces are characterized by a tapered profile height, which decreases with increasing proximity to the point at which the actuator applies a closing force when rotating the valve doors into a closed position (referred to herein as the "torque input point"). In this regard, the edge region of the laterally-tapered sealing surface furthest from the torque input point (referred to herein as the "far edge region") may be imparted with an increased profile height as compared to the edge region of the laterally-tapered sealing surface near the torque input point (referred to herein as the "near edge region"). This ensures that, when the laterally-tapered sealing surface is pressed or pinched against a mating sealing surface, contact initially occurs between the mating sealing surface and the laterally-tapered sealing surface at the far edge region whereat the asymmetrical closing force is weakest. When contact first occurs between the mating sealing surface and the far edge region of the laterally-tapered sealing surface, a wedge-shaped gap is formed between the sealing surfaces with the gap width increasing with increasing proximity to the near edge region. This gap is easily and reliably closed, however, as the asymmetrical closing force also increases when moving toward the near edge region. In this manner, a continuous and gap-free lateral seal can be reliably created between the sealing surfaces when the valve door(s) are rotated into a closed position to significantly reduce or eliminate leakage across the outflow valve. Additionally, a preload is applied to the valve door(s) at the location closest to the actuator or torque input point to effectively "pinch" the laterally-tapered sealing surface against the mating sealing surface and thereby close the outflow valve. As a result of this preload, when an elevated pressure is applied across the outflow valve that might otherwise reopen the gap between the sealing surfaces, the pressure instead relaxes the valve door(s) to a more neutral, non-gapped position as the pressure attempts to overcome the preload.

For the purposes of illustration, the following description will focus primarily on a two-door cabin outflow valve including a first door (the forward door) having a laterally-tapered sealing surface, which engages a mating sealing surface provided on a second door (the aft door) when in a closed position. The following description notwithstanding, it is emphasized that embodiments of the cabin outflow valve can include any practical number of doors and laterally-tapered sealing surfaces. Further, the laterally-tapered sealing surface(s) can be located on a single door, on multiple doors, and/or on the frame or another structure sealingly contacted by a door when in a closed position. Additionally, embodiments of the laterally-sealing valves described herein are not limited to usage as cabin outflow valves; instead, the below-described valves can be utilized in any application wherein it is desired to minimize leakage across the valve when in a closed position and subject to pressure loading, and wherein an asymmetrical closing force is applied to at least one valve door when rotating the door into a closed position. An exemplary embodiment of a cabin outflow valve including a laterally-tapered sealing surface will now be described in conjunction with FIGS. 1-7.

Figure 1:
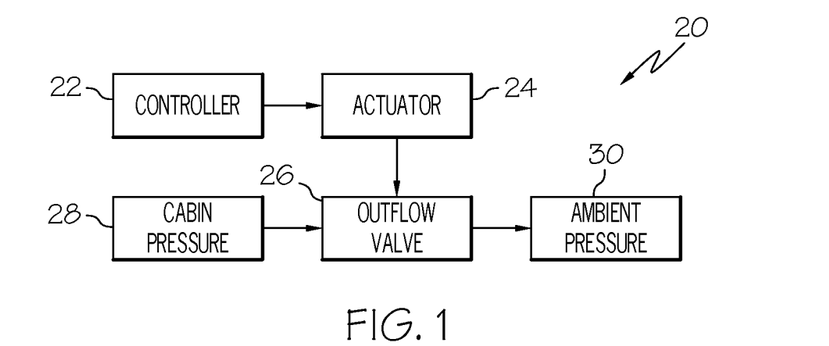
FIG. 1 is a generalized block diagram of an exemplary Cabin Pressure Control System (CPCS)

FIG. 1 is a functional block diagram of an exemplary Cabin Pressure Control System (CPCS) 20 suitable for deployment onboard an aircraft. In this particular example, CPCS 20 includes three main components, namely, a controller 22, an actuator 24, and a cabin outflow valve 26. Cabin outflow valve 26 is fluidly coupled between an aircraft's cabin or fuselage (represented in FIG. 1 by block 28) and a low pressure sink, such as ambient (represented in FIG. 1 by block 30). In one specific implementation, cabin outflow valve 26 is mounted through a wall of the aircraft's fuselage, preferably in the rear underbelly of the aircraft proximate the tail. As will be further discussed below, cabin outflow valve 26 may be positioned so as to provide additional forward thrust to the host aircraft when venting pressurized air from the aircraft's cabin (block 28) to ambient (block 30). Actuator 24 can be any hydraulic, pneumatic, or electromechanical device capable of moving outflow valve 26 between open and closed positions in accordance with commands received from controller 22. In one embodiment, actuator 24 assumes the form of at least one electric drive motor having a rotary output.

Controller 22 is operatively (e.g., electrically) coupled to actuator 24, which is, in turn, mechanically coupled to cabin outflow valve 26. During operation of CPCS 20, controller 22 commands actuator 24 to move cabin outflow valve 26, and more specifically at least one valve element included within cabin outflow valve 26, between a fully closed position and a partially open (cruise) position. By actively modulating cabin outflow valve 26 in this manner, controller 22 maintains the aircraft cabin pressure (block 28) within a desired range during flight. Controller 22 may command actuator 24 to modulate cabin outflow valve 26 in accordance with a predetermined schedule or, perhaps, as a function of one or more operational criteria; e.g., as a function of cabin pressure (block 28) as monitored by a non-illustrated pressure sensor operatively coupled to controller 22.

Figure 2:
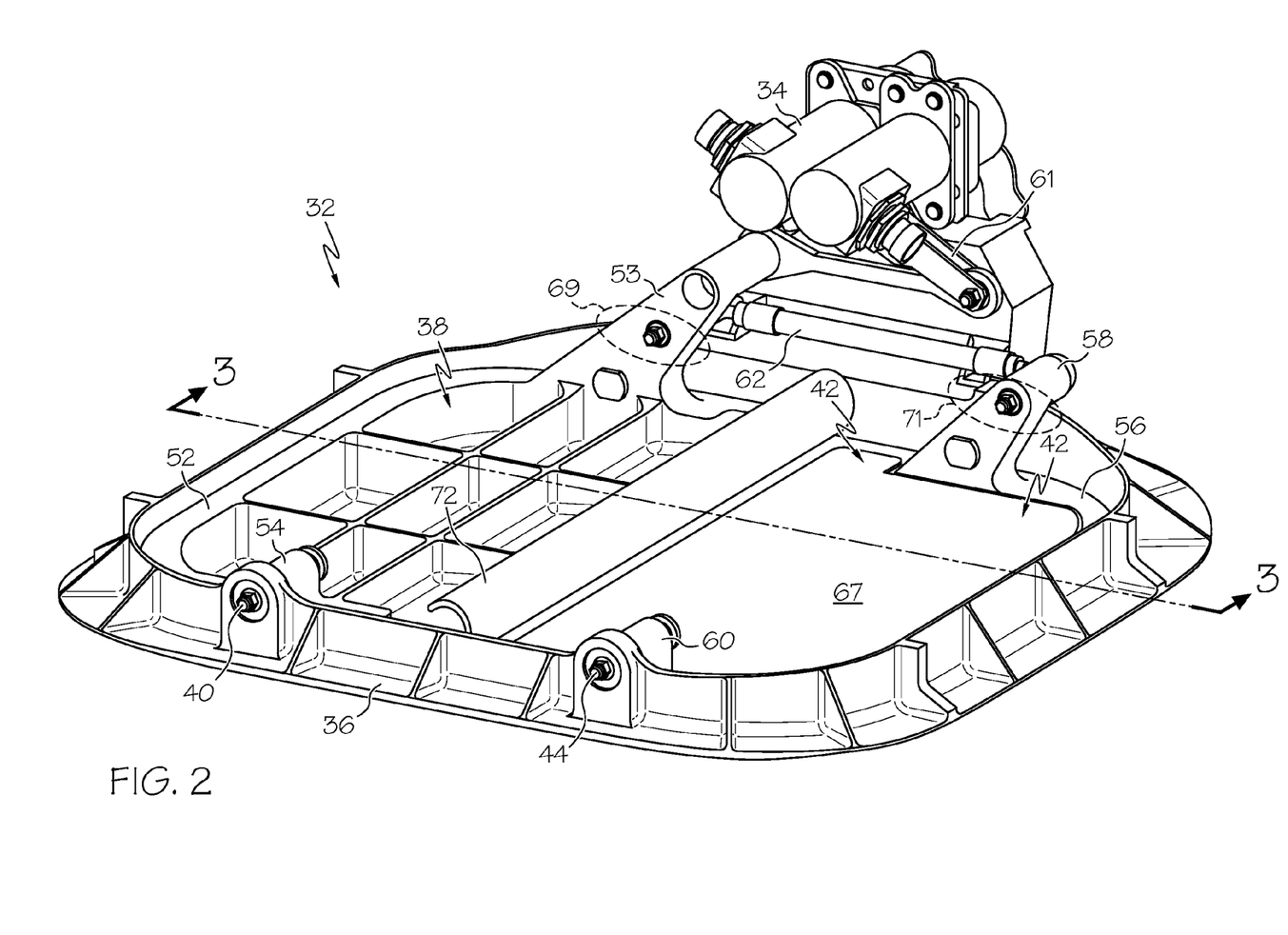
FIG. 2 is an isometric view of a cabin outflow valve suitable for usage within the CPCS shown in FIG. 1, as illustrated in accordance with an exemplary embodiment of the present invention.

FIG. 2 is an isometric view of a multi-door cabin outflow valve 32 and an actuator 34 in accordance with an exemplary embodiment. Cabin outflow valve 32 and actuator 34 are suitable for use as cabin outflow valve 26 and actuator 24, respectively, shown in FIG. 1. Cabin outflow valve 32 includes a frame 36, a first door 38 (e.g., a rectangular butterfly plate) pivotally mounted to a first portion of frame 36 (indicated in FIG. 2 at pivot 40), and a second door 42 (e.g., a rectangular butterfly plate) pivotally mounted to a second portion of frame 36 (indicated in FIG. 2 at pivot 44). In the illustrated exemplary embodiment, actuator 34 assumes the form of twin electrical drive motors, which are each mounted on an outer peripheral portion of frame 36 to one side of doors 38 and 42. When cabin outflow valve 32 is installed on an aircraft, frame 36 may be mounted through a wall of the aircraft fuselage. In a preferred embodiment, cabin outflow valve 32 is mounted through the aircraft's underbelly proximate the aircraft's tail such that first door 38 is closer to the aircraft's tail than is second door 42. For this reason, first door 38 and second door 42 will be referred to herein as "aft door 38" and "forward door 42," respectively.

Aft door 38 includes a main, plate-like body 52 from which a primary arm 53 and a secondary arm 54 extend. Secondary arm 54 is rotatably joined to frame 36 at pivot coupling 40. Similarly, primary arm 53 is rotatably coupled to frame 36 at a second pivot coupling (hidden from view in FIG. 2) and mechanically linked to side-mounted actuator 34 via a master linkage 61 (e.g., a bell crank linkage). Forward door 42 likewise includes a main, plate like body 56 from which a primary arm 58 and a secondary arm 60 extend. Secondary arm 60 is rotatably coupled to frame 36 at pivot coupling 44, while primary arm 58 is rotatably coupled to frame 36 at a second pivot coupling (also hidden from view). Primary arm 58 of forward door 42 is further mechanically linked to arm 58 of forward door 42 via a slave link 62. Primary arm 53, primary arm 58, and slave link 62 thus collectively form a linkage that enables actuator 34 to simultaneously move aft and forward doors 38 and 42 between the closed and open (cruise) positions described below in conjunction with FIGS. 3 and 4. When rotating aft door 38 into the closed position, actuator 34 applies a closing force to main body 52 of aft door 38 at a first torque input point, which is generally identified in FIG. 2 by dashed circle 69. Similarly, when simultaneously rotating forward door 42 into the closed position, actuator 34 applies a closing force to main body 56 of forward door 42 at a second torque input point, which is generally identified by dashed circle 71.

Figure 3:
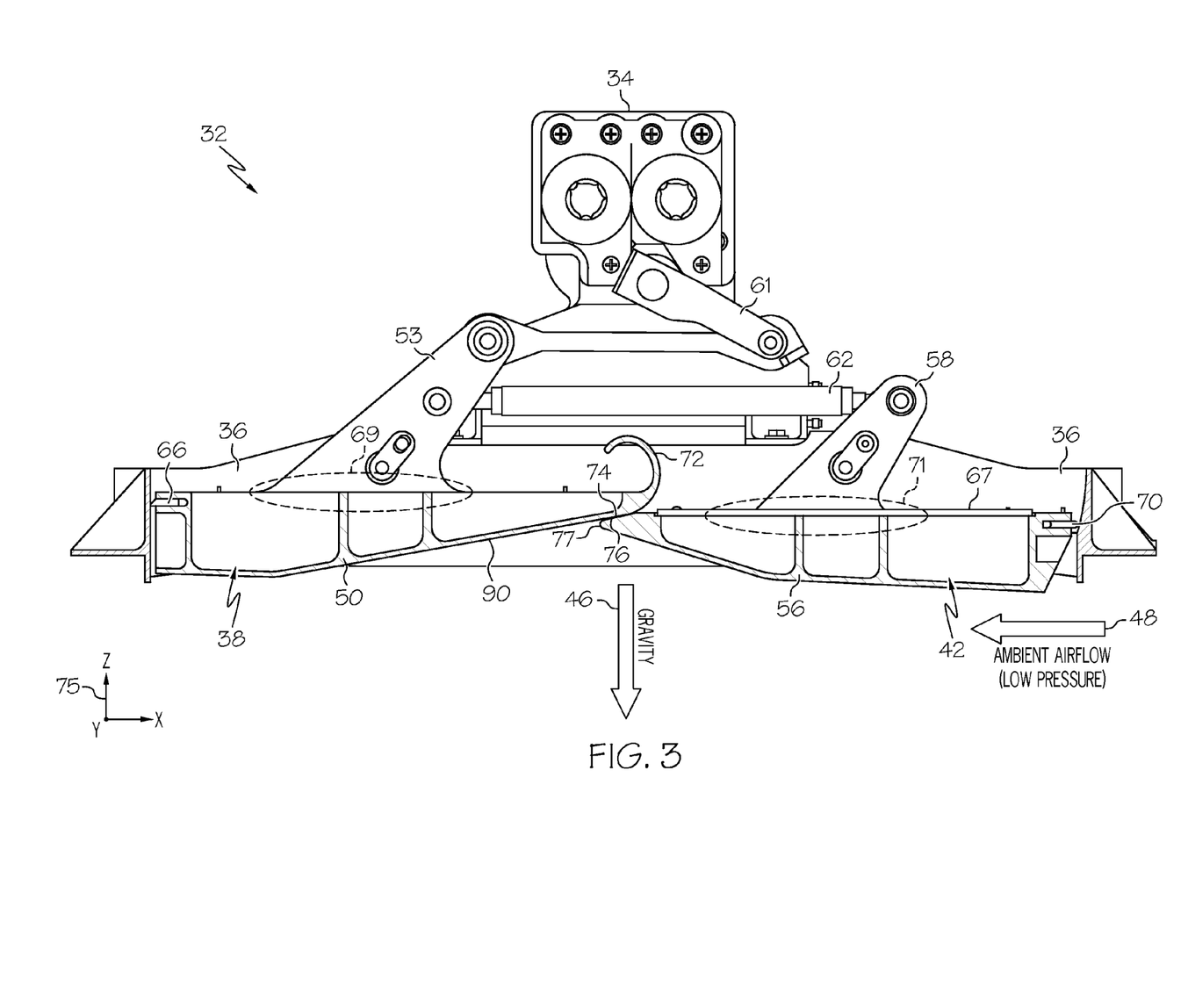
FIGS. 3 and 4 are side cross-sectional views of the cabin outflow valve shown in FIG. 2 in a closed and partially opened (cruise) positions, respectively, as taken along line 3-3 (identified in FIG. 2)
Figure 4:
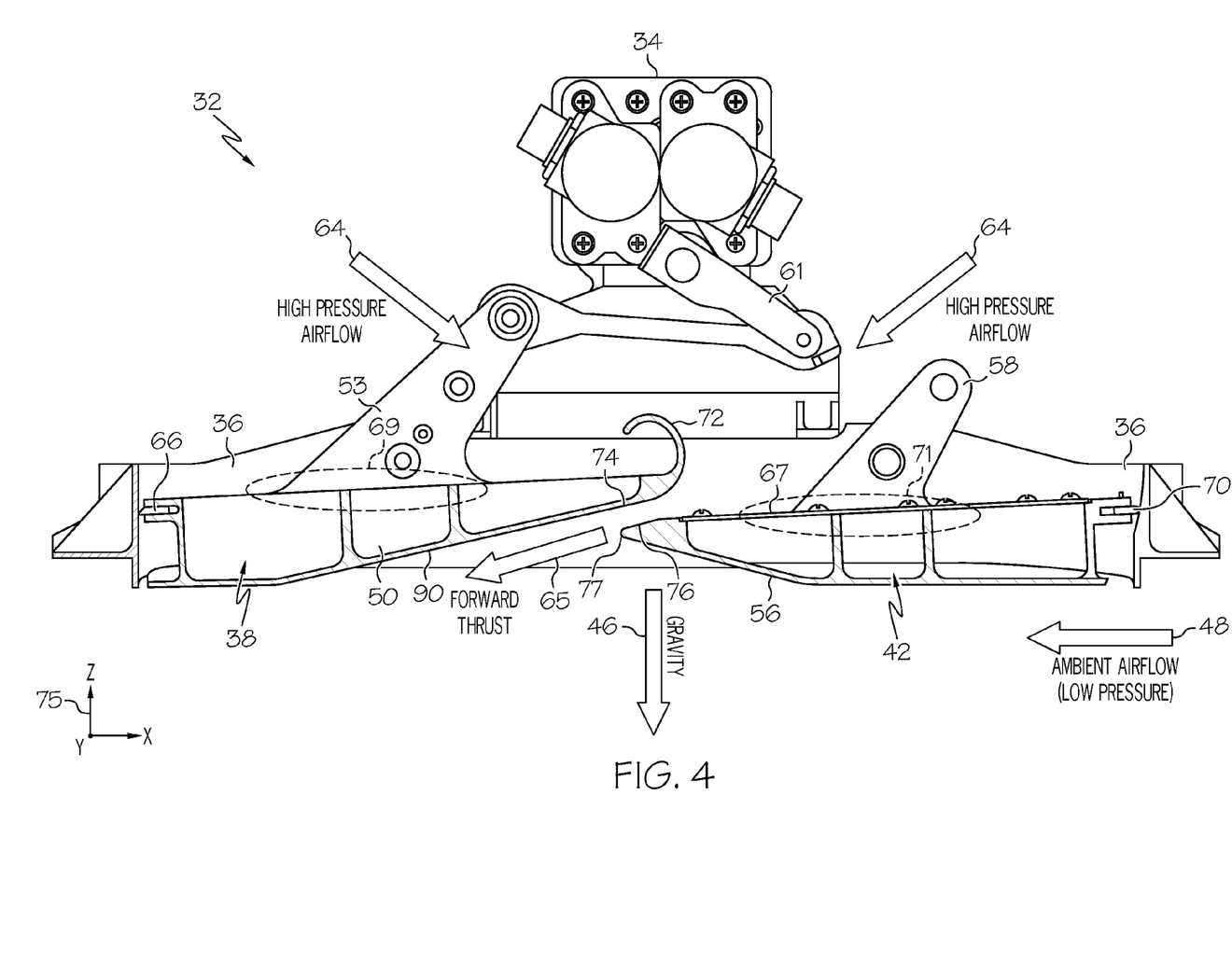

FIGS. 3 and 4 are side cross-sectional views of cabin outflow valve 32 in closed position and partially open (cruise) positions, respectively, as taken along line 3-3 in FIG. 2. As can be seen, aft door 38 carries a first wiper seal 66, which extends around the outer sealing periphery of aft door 38 (i.e., the three sides of aft door 38 adjacent frame 36). Forward door 42 is likewise equipped with a wiper seal 70, which may extend around the outer sealing periphery of forward door 42 (i.e., the three sides of forward door 42 adjacent frame 36). Seals 66 and 70 may each be partially embedded within (e.g., dovetail with) mating slots provided in aft and forward doors 38 and 42. If desired, seals 66 and 70 may each be energized by a wave spring or other suitable means. Seals 66 and 70 may be formed from various conventionally-known polymeric materials including, for example, extruded silicone or polytetrafluoroethylene (e.g., Teflon®). Seals 66 and 70 may each be single piece or multi-piece seals. Alternative embodiments of cabin outflow valve 32 may not include one or more of seals 66 and 70 depending upon desired sealing characteristics.

Actuator 34 moves cabin outflow valve 32 between partially open (cruise) and closed positions by rotating aft door 38 and forward door 42 about rotational axes, which extend into the page in FIGS. 3 and 4 and are parallel to the Y-axis identified by coordinate legend 75. When cabin outflow valve 32 is moved into the partially open (cruise) position shown in FIG. 4, pressurized air flows from the aircraft fuselage, through doors 38 and 42, and to the ambient environment (represented in FIG. 4 by arrows 64). Cabin outflow valve 32 is preferably designed such that pressurized airflow through aft and forward doors 38 and 42 occurs in a relatively smooth and quiet manner. In addition, when utilized for thrust recovery, cabin outflow valve 32 preferably encourages the rapid outflow of pressurized air to maximize the thrust output (represented in FIG. 4 by arrow 65). To promote relatively smooth airflow through cabin outflow valve 32 in the cruise position (FIG. 4), a bellmouth 72 can be fixedly coupled to aft door 38. Bellmouth 72 can assume the form of a generally curved wall, which extends from main body 52 of aft door 38 proximate its leading edge and then curls back toward the body of aft door 38. In further embodiments, cabin outflow valve 32 may not include bellmouth 72.

When cabin outflow valve 32 is moved into the closed position (FIG. 3), aft and forward doors 38 and 42 rotate into contact to form a door-to-door seal. The surface along which forward door 42 contacts aft door 38 is referred to herein as a "first sealing surface" and is identified in FIGS. 3 and 4 by reference numeral "76." In the illustrated example, first sealing surface 76 is slightly inset from the trailing edge 77 of forward door 42. The surface along which aft door 38 contacts forward door 42 is referred to herein as a "second sealing surface" or a "mating surface" and is identified in FIGS. 3 and 4 by reference numeral "74." Sealing surface 74 may also be slightly inset from the leading edge of aft door 38. If an incomplete or discontinuous seal is formed between sealing surfaces 74 and 76 when outflow valve 32 is moved into the closed position (FIG. 3), a gap will remain between aft and forward doors 38 and 42 allowing leakage to occur. While the amount of leakage will be dependent upon the gap size and the pressure differential across cabin outflow valve 32, even a small gap on the order of a few thousandths of an inch can result in undesirably high leakage levels across outflow valve 32.

The formation of leakage gaps between sealing surfaces 74 and 76 can be problematic in the case of conventional outflow valves due, at least in part, to the asymmetrical closing force applied to doors 38 and 42 by side-mounted actuator 34. Consider, for example, a scenario wherein the near edge region of sealing surface 76 (that is, the edge region located closer to torque input point 71 and side-mounted actuator 34) contacts sealing surface 74 prior to the far edge region of sealing surface 76 (that is, the edge region located further from torque input point 71 and actuator 34). In such a scenario, a leakage gap will develop between the far edge region of sealing surface 76 and mating surface 74. As the torque or closing force applied at the far edge region of sealing surface 76 is weakest at this point, actuator 34 may be unable to close this gap and leakage may result. This scenario is avoided in the case of cabin outflow valve 32, however, by fabricating sealing surface 76 of forward door 42 to have a laterally-tapered profile. Imparting sealing surface 76 with such a laterally-tapered profile ensures the formation of a complete lateral seal between sealing surfaces 74 and 76 when doors 38 and 42 are rotated into a closed position, as described in conjunction with FIGS. 5-7.

Figure 5:
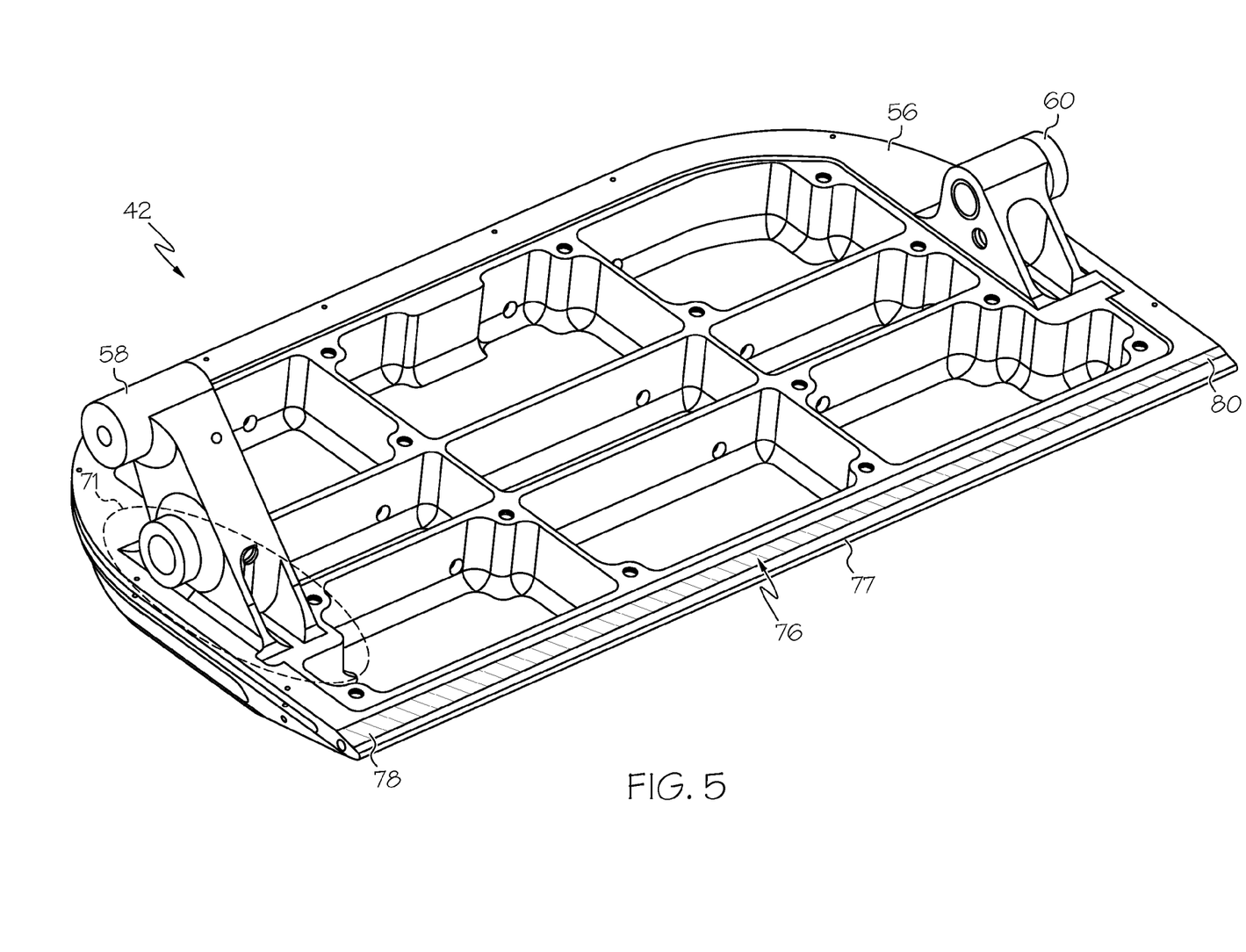
FIGS. 5 and 6 are isometric and side views, respectively, of the forward door included within the cabin outflow valve shown in FIGS. 2-4 more clearly illustrating the laterally-tapered sealing surface provided on the forward door.

FIG. 5 is an isometric view of forward door 42 illustrating laterally-tapered sealing surface 76 in greater detail (backing plate 67 not shown). It will be noted that, from the perspective shown in FIG. 5, forward door 42 is rotated about a vertical axis by roughly 180 degrees relative to the perspective shown in FIG. 2. Laterally-tapered sealing surface 76 includes a near edge region 78 and a far edge region 80, which are spaced along a lateral axis of cabin outflow valve 32; that is, an axis of cabin outflow valve 32 that extends parallel to the rotational axis of forward door 42 and parallel to the Y-axis identified by coordinate legend 75 (FIGS. 3 and 4). As previously indicated, the terms "near" and "far" are utilized to denote the relative proximity of edge regions 78 and 80 to torque input point 71 (FIGS. 2-5) and, in certain cases, to side-mounted actuator 34 (FIGS. 2-4).

Figure 6:
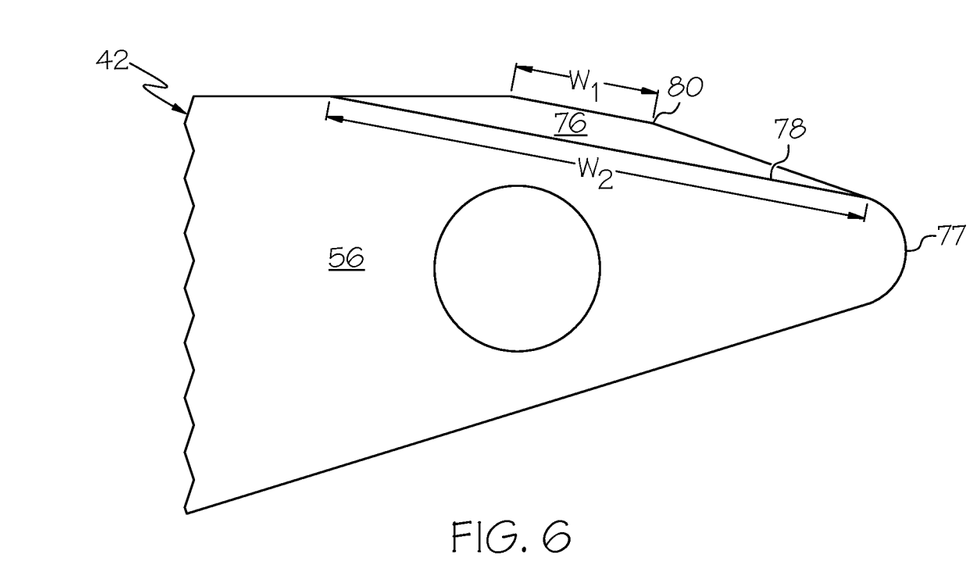

FIG. 6 is a side view of the end portion of forward door 42 across which laterally-tapered sealing surface 76 extends. Referring collectively to FIGS. 5 and 6, and as shown most clearly in FIG. 6, far edge region 80 of sealing surface 76 has a greater (higher or taller) profile height than does near edge region 78; the term "profile height" referring to the elevation of sealing surface 76, when viewed from a side of door 42 along the lateral axis of cabin outflow valve 32. Specifically, laterally-tapered sealing surface 76 is contoured to have a minimum profile height ($P_{min}$) at near edge region 78 and a maximum profile height ($P_{max}$) at far edge region 80. The profile height of laterally-tapered sealing surface 76 increases gradually from the minimum profile height ($P_{min}$) to the maximum profile height ($P_{max}$) when moving across sealing surface 76 along a lateral axis of cabin outflow valve 32 and forward door 42 (again, an axis parallel to the rotational axis of forward door 42 and to the Y-axis identified by coordinate legend 75 in FIGS. 3 and 4) toward far edge region 80. The values of $P_{min}$ and $P_{max}$ will vary amongst different embodiments and can be tailored to best suit a particular application and valve size. In general, though, $P_{min}$ and $P_{max}$ are preferably selected such that the difference between these values ($P_{delta}$) exceeds the cumulative manufacturing profile tolerances affecting the position of laterally-tapered sealing surface 76 relative to mating sealing surface 74 when doors 38 and 42 are rotated into a closed position. In one embodiment, $P_{delta}$ is greater than about 0.010 inch (0.254 millimeter).

Figure 7:
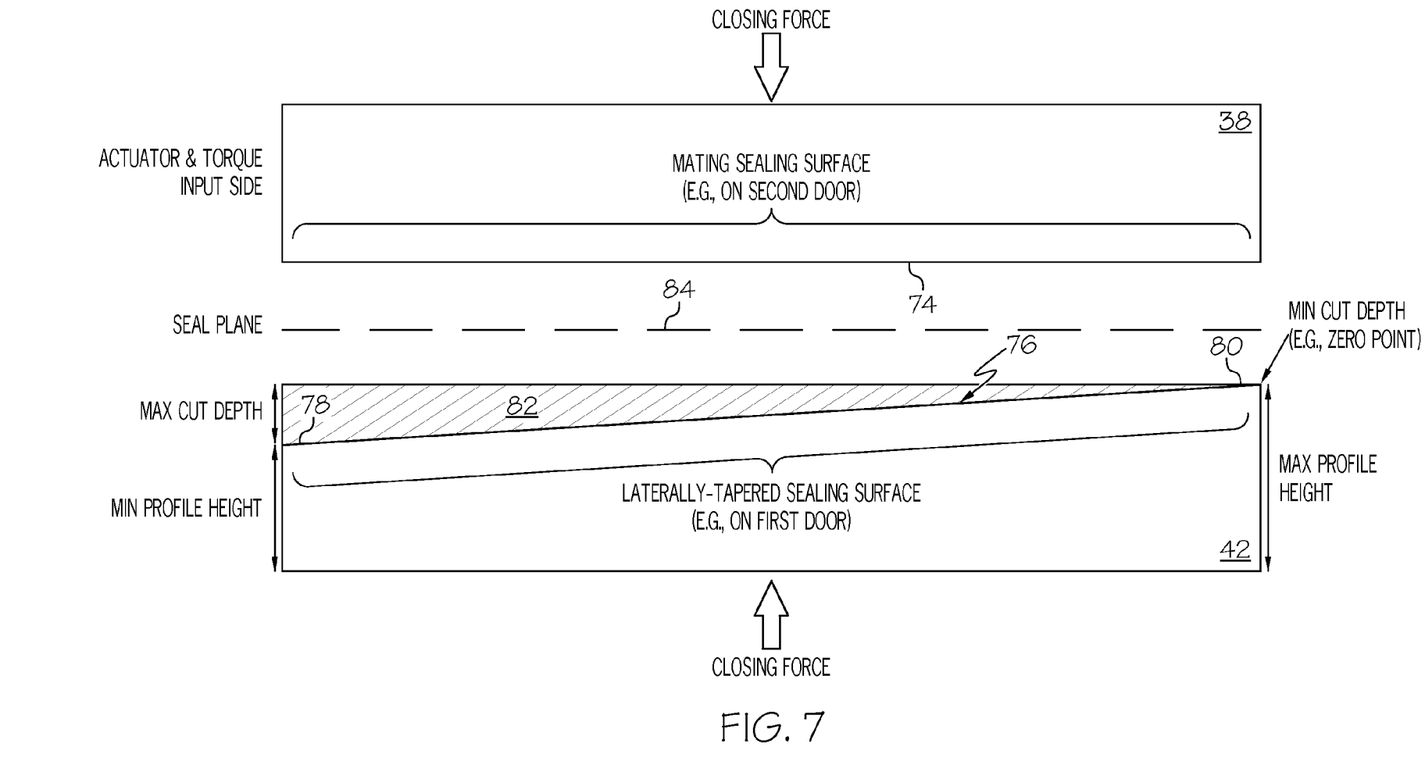
FIG. 7 is a schematic illustrating a manner in which the laterally-tapered sealing surface can be produced as a machined surface having a cut depth that increases with increasing proximity to the torque input point shown in FIGS. 2-5 and to the side-mounted actuator shown in FIGS. 2-4.

Various different manufacturing techniques can be employed to impart sealing surface 76 of forward door 42 with a laterally-tapered profile height. In a preferred embodiment, forward door 42 is initially produced to have non-tapered geometry near its trailing edge and a secondary machining process is subsequently carried-out to remove material from door 42 to yield laterally-tapered sealing surface 76. In such embodiments, laterally-tapered sealing surface 76 may also be referred to as a "machined surface" or a "tapered cut surface." In this case, material can be removed from the trailing end portion of forward door 42 along a tilted cut plane having a cut depth that increases with increasing proximity to torque input point 71 (FIGS. 2-5) and side-mounted actuator 34 (FIGS. 2-4). This may be more fully appreciated by referring to FIG. 7, which is a conceptual schematic of aft door 38 and forward door 42 (shown in cross-section and not drawn to scale). As schematically illustrated in FIG. 7, the material removed from forward door 42 to produce sealing surface 76 is represented by cross-hatched area 82 such that tapered sealing surface 76 is coplanar with a skewed or tilted cut plane 86. Cut plane 86 is "tilted" with respect to a seal plane (further represented in FIG. 7 by dashed line 84) along which surfaces 74 and 76 contact when cabin outflow valve 32 is in the closed position and/or with respect to a plane containing a longitudinal and lateral axis of outflow valve 32.

Although not shown, side-mounted actuator 34 (FIGS. 2-4) and torque input point 71 (FIGS. 2-5) are generally located on the left side of FIG. 7, as indicated by the label "actuator/torque input side." It can thus be seen that, as previously described, laterally-tapered sealing surface 76 of forward door 42 has a profile height that decreases with increasing proximity to the side of door 42 at which torque is applied (torque input point 71 shown in FIGS. 2-5) and adjacent the mounting location of actuator 34 (FIGS. 2-4). The machined surface defining laterally-tapered sealing surface 76 further has a cut depth that increases with increasing proximity to the actuator location/torque input point. As a corollary, the trailing end region of forward door 42 on which laterally-tapered sealing surface 76 is located is imparted with a laterally-tapered thickness, which decreases with increasing proximity to the actuator/torque input point. Additionally, in embodiments wherein forward door 42 has a sloped or curved profile near its trailing edge, the width of the machined surface may increase with increasing proximity to the actuator/torque input point. This can readily be appreciated by referring to FIG. 6 wherein it can further be seen that laterally-tapered sealing surface 76 (the machined surface) has a minimum width $W_1$ at far edge region 80 and a maximum width $W_2$ at near edge region 78.

As doors 38 and 42 are rotated into the closed position, far edge region 80 of latterly-tapered sealing surface 76 contacts mating sealing surface 74 before contact occurs between near edge region 78 and surface 74. Relatively low torque demands are thus placed on actuator 34 (FIGS. 2-4) in ensuring contact between sealing surface 74 and far edge region 80 whereat the applied torque is weakest. When far edge region 80 first contacts mating sealing surface 74, a wedge-shaped gap is formed between sealing surfaces 74 and 76. The wedge-shaped gap will typically have a geometry similar to that of cross-hatched area 82 (FIG. 7) and a width that increases with increasing proximity to near edge region 78 and, therefore, to torque input point 71 (FIGS. 2-5) and side-mounted actuator 34 (FIGS. 2-4). This gap can be closed with relative ease, however, as the torque applied by actuator 34 likewise increases in strength with increasing proximity to near edge region 78. Stated differently, actuator 34 can readily be configured to exert a sufficient closing force to deflect latterly-tapered sealing surface 76 and close the gap temporarily formed between doors 38 and 42. Laterally-tapered sealing surface 76 consequently provides a more effective gap closure mechanism thereby ensuring the formation of a relatively robust and continuous seal between doors 38 and 42 when rotated into the closed position (FIG. 3). Leakage through cabin outflow valve 32 can be minimized to exceptionally low levels as a result. Additionally, as laterally-tapered sealing surface 76 can be produced utilizing a relatively straightforward machining or taper cut process of the type described above, cabin outflow valve 32 can achieve such exceptionally low leakage levels without the addition of weight, bulk, or significant manufacturing cost.

In the foregoing example, cabin outflow valve 32 is produced to include a single laterally-tapered or tilted sealing surface 76 on forward door 42. Conversely, aft door 38 is produced to have a non-tapered sealing surface 74, which sealingly engages laterally-tapered sealing surface when outflow valve 32 is moved into a closed position (FIG. 3). Such a design can be advantageous for at least two reasons. First, imparting a single sealing surface with a laterally-tapered profile is typically sufficient to bring about the desired reductions in leakage. Thus, the creation of multiple laterally-tapered sealing surfaces when the outflow valve includes one or two doors will often be unnecessary. Second, due at least in part to the presence of bellmouth 72, it will often be easier to impart sealing surface 76 of forward door 42 with a tapered profile (e.g., utilizing a taper cut technique of the type described above) as opposed to imparting sealing surface 74 of aft door 38 with such a tapered profile. These advantages notwithstanding, sealing surface 74 of aft door 38 can be imparted with a tapered profile in further embodiments regardless of whether sealing surface 76 of forward door 42 is imparted with a tapered profile. Additionally, in still further embodiments, a laterally-tapered sealing surface can be created on a different sealing portion of the outflow valve (e.g., on the frame or a valve seat) that is sealingly engaged by a valve door when rotated into a closed position.

The foregoing has thus provided embodiments of a cabin outflow valve including one or more laterally-tapered sealing surfaces, which provide effective gap closure to decrease leakage through the outflow valve when in a closed position. Advantageously, embodiments of the above-described cabin outflow valve can be produced to have such a laterally-tapered sealing surface in a relatively straightforward, cost-effective manner (e.g., by performing an additional machining or taper cut step) and without adding weight or bulk to the outflow valve. The foregoing has also provided embodiments of a cabin pressure control system including such an ultralow leakage cabin outflow valve. Finally, it will be noted that the valves described above are not limited to usage as cabin outflow valve and, instead, can be utilized in any application wherein it is desired to provide a laterally-sealing valve through which leakage is minimized when the valve is closed and subject to pressure loading.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A cabin outflow valve utilized in conjunction with an actuator, the cabin outflow valve comprising:
   a frame; and
   a first door pivotally coupled to the frame and configured to be rotated by the actuator between open and closed positions, the first door comprising:
      a torque input point at which the actuator applies a closing force when rotating the first door into the closed position; and
      a laterally-tapered sealing surface extending along a lateral axis parallel to a rotational axis of the first door of the cabin outflow valve, the laterally-tapered sealing surface having a profile height that decreases with increasing proximity to the torque input point.

2. The cabin outflow valve of claim 1 wherein the laterally-tapered sealing surface comprises near and far edge regions spaced along the lateral axis, the near edge region located closer to the torque input point than the far edge region and having a profile height less than a profile height of the far edge region.

3. The cabin outflow valve of claim 2 further comprising a mating sealing surface with which the laterally-tapered sealing surface forms a seal when the first door is rotated into the closed position, the near edge region contacting the mating sealing surface after the far edge region contacts the mating sealing surface when the first door is rotated into the closed position.

4. The cabin outflow valve of claim 3 further comprising a second door pivotally coupled to the frame and configured to rotate with the first door between open and closed positions, the mating sealing surface provided on the second door.

5. The cabin outflow valve of claim 4 wherein the first and second doors comprise forward and aft doors, respectively.

6. The cabin outflow valve of claim 2 wherein the near edge region has a minimum profile height $P_{min}$, wherein the far edge region has a maximum profile height $P_{max}$, and wherein the profile height of the laterally-tapered sealing surface increases gradually from $P_{min}$ to $P_{max}$ when moving along the lateral axis from the near edge region to the far edge region.

7. The cabin outflow valve of claim 6 wherein the difference between $P_{min}$ and $P_{max}$ is greater than a cumulative manufacturing profile tolerance of the cabin outflow valve.

8. The cabin outflow valve of claim 1 wherein the laterally-tapered sealing surface comprises a machined surface having a cut depth increasing with increasing proximity to the torque input point.

9. The cabin outflow valve of claim 8 wherein the machined surface further has a cut width that increases with increasing proximity to the torque input point.

10. The cabin outflow valve of claim 8 wherein the machined surface extends across a region of the first door having a laterally-tapered thickness, which decreases with increasing proximity to the torque input point.

11. A cabin pressure control system, comprising:
   a cabin outflow valve, comprising:
      a first door coupled to an actuator and rotatable between open and closed positions;
      a first sealing surface; and
      a second sealing surface contacting the first sealing surface when the first door is rotated into the closed position; and
   the actuator mechanically linked to the first door and exerting an asymmetrical closing force thereon when rotating the first door into the closed position;
   wherein the first sealing surface has a near edge region and a far edge region spaced along a lateral axis of the cabin outflow valve, wherein the near edge region is located closer to the actuator than is the far edge region, and wherein the first sealing surface is contoured such that the far edge region contacts the second sealing surface before the near edge region contacts the second sealing surface when the first door is rotated into the closed position.

12. The cabin pressure control system of claim 11 wherein the first sealing surface is contoured such that a wedge-shaped gap is formed between the first and second sealing surfaces when the far edge region initially contacts the second sealing surface, and wherein the actuator is configured to exert a sufficient closing force on the first door to deflect the first sealing surface and close the wedge-shaped gap when rotating the first door into the closed position.

13. The cabin pressure control system of claim 11 wherein the first sealing surface is located on a region of the first door having a laterally-tapered thickness, which decreases with increasing proximity to the actuator.

14. The cabin pressure control system of claim 11 wherein the first sealing surface is located on the first door, wherein the cabin pressure control system further comprises a second door coupled to the actuator and configured to rotate in conjunction with the first door between the open and closed positions, and wherein the second sealing surface is located on the second door.

15. The cabin pressure control system of claim 11 wherein the first surface comprises a taper cut surface having a cut depth that increases when moving from the far edge region toward the near edge region.

16. The cabin outflow valve of claim 15 wherein the taper cut surface further has a cut width that increases with increasing proximity to the torque input point.

17. A valve utilized in conjunction with an actuator, the valve comprising:
a frame;
a valve door pivotally coupled to the frame and configured to be rotated by the actuator between open and closed positions;
a torque input point at which the actuator applies a closing force when rotating the valve door into the closed position;
a mating sealing surface; and
a laterally-tapered sealing surface contacting the mating sealing surface when the valve door is rotated into the closed position, the laterally-tapered sealing surface having a profile height that decreases with increasing proximity to the torque input point, as taken along a lateral axis of the valve.

18. The valve of claim 17 wherein the laterally-tapered sealing surface comprises near and far edge regions spaced along the lateral axis, the near edge region located closer to the torque input point than the far edge region and having a profile height less than a profile height of the far edge region.

19. The valve of claim 18 wherein the near edge region contacts the mating sealing surface after the far edge region contacts the mating sealing surface when the door is rotated into the closed position.

20. The valve of claim 17 wherein the laterally-tapered sealing surface comprises a machined surface having a cut depth increasing with increasing proximity to the torque input point.

* * * * *